United States Patent
Son et al.

(10) Patent No.: US 9,970,666 B2
(45) Date of Patent: May 15, 2018

(54) AIR CONDITIONER SYSTEM

(71) Applicant: LG ELECTRONICS INC., Seoul (KR)

(72) Inventors: Sanghye Son, Seoul (KR); Hyeongyeong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 240 days.

(21) Appl. No.: 14/710,347

(22) Filed: May 12, 2015

(65) Prior Publication Data

US 2015/0323207 A1    Nov. 12, 2015

(30) Foreign Application Priority Data

May 12, 2014  (KR) .................. 10-2014-0056794

(51) Int. Cl.
    *G05B 21/00*    (2006.01)
    *G05B 13/00*    (2006.01)
    (Continued)

(52) U.S. Cl.
    CPC ............ *F24F 3/044* (2013.01); *F24F 11/006* (2013.01); *F24F 11/0012* (2013.01);
    (Continued)

(58) Field of Classification Search
    CPC ........ F24F 3/044; F24F 11/02; F24F 11/0086; F24F 11/006; F24F 11/0012; F24F 13/04;
    (Continued)

(56) References Cited

U.S. PATENT DOCUMENTS 6,282,910 B1 *  9/2001  Helt .................... F24F 11/0079
                                                                62/229
6,408,228 B1 *  6/2002  Seem .................. F24F 11/0086
                                                                700/276
(Continued)

FOREIGN PATENT DOCUMENTS

CN    201141661    10/2008
CN    102252378    11/2011
(Continued)

OTHER PUBLICATIONS

European Search Report for Application 15167110.4 dated Dec. 18, 2015.
(Continued)

*Primary Examiner* — Ziaul Karim
(74) *Attorney, Agent, or Firm* — KED & Associates, LLP

(57) ABSTRACT

Disclosed herein is an air conditioning system. The conditioning system includes an air handling unit (AHU) configured to control outdoor air that is externally supplied, exhaust air that is outdoors discharged, and return air that is circulated indoors and supplied again, control the outdoor air or mixed air of the return air and the outdoor air at a set temperature, and supply cool/warm supply air indoors, at least one outdoor unit configured to supply a heat source for a heat exchange to the AHU, a controller configured to receive operating state data of the AHU and control an operation of the AHU through communication with the outdoor unit, and an interface unit connected to the controller and configured to output a control menu of the AHU, send data received through the control menu to the controller, and output a monitoring screen for the operating state of the AHU and the outdoor unit.

13 Claims, 11 Drawing Sheets

(51) Int. Cl.
*G05B 15/00* (2006.01)
*F24F 3/044* (2006.01)
*F24F 11/00* (2018.01)
*F24F 13/04* (2006.01)
*G05B 15/02* (2006.01)
*F24F 11/02* (2006.01)

(52) U.S. Cl.
CPC .......... *F24F 11/0086* (2013.01); *F24F 11/02* (2013.01); *F24F 13/04* (2013.01); *G05B 15/02* (2013.01); *F24F 11/0034* (2013.01); *F24F 2011/0013* (2013.01); *F24F 2011/0047* (2013.01); *F24F 2011/0063* (2013.01); *F24F 2011/0064* (2013.01); *F24F 2011/0068* (2013.01); *F24F 2011/0091* (2013.01); *Y02B 30/767* (2013.01)

(58) Field of Classification Search
CPC ....... F24F 2011/0063; F24F 2011/0064; F24F 2011/0091; F24F 2011/0068; F24F 2011/0047; G05B 15/02; Y02B 30/767
USPC .................................. 700/276–294
See application file for complete search history.

(56) References Cited

U.S. PATENT DOCUMENTS

| | | | |
|---|---|---|---|
| 2004/0112082 A1* | 6/2004 | Tanimoto | F25B 13/00 62/510 |
| 2007/0228183 A1 | 10/2007 | Kennedy et al. | |
| 2008/0179053 A1 | 7/2008 | Kates | |
| 2010/0070085 A1 | 3/2010 | Harrod et al. | |
| 2011/0093121 A1* | 4/2011 | Wakuta | F24F 11/006 700/276 |
| 2011/0185302 A1 | 7/2011 | Kalapodas et al. | |
| 2014/0031989 A1 | 1/2014 | Bergman et al. | |

FOREIGN PATENT DOCUMENTS

| | | |
|---|---|---|
| CN | 202403371 | 8/2012 |
| CN | 203336769 | 12/2013 |
| EP | 0 892 330 A1 | 1/1999 |
| JP | 2010-276212 | 12/2010 |
| KR | 10-2007-0058139 A | 6/2007 |
| KR | 10-2009-0037228 A | 4/2009 |
| KR | 10-2010-0089652 | 8/2010 |
| KR | 10-2014-0046713 A | 4/2014 |

OTHER PUBLICATIONS

Korean Office Action for Application 10-2014-0056794 dated Feb. 1, 2016.
"Building Equipment Automatic Control"; Mar. 8, 1999, pp. 216-218. ISBN 89-88731-02-6.
Korean Office Action dated Jun. 22, 2015 issued in Application No. 10-2014-0056794.
Korean Office Action dated Mar. 27, 2017 issued in Application No. 10-2016-0114626.
Chinese Office Action issued in Application 201510239197.9 dated Aug. 3, 2017 (full Chinese text).

* cited by examiner

AIR CONDITIONER SYSTEM

CROSS-REFERENCE TO RELATED APPLICATION

This application claims the priority benefit of Korean Patent Application No. 10-2014-0056794, filed on May 12, 2014 in the Korean Intellectual Property Office, the disclosure of which is incorporated herein by reference.

BACKGROUND

1. Field

The present invention relates to an air conditioning system and, more particularly, to an air conditioning system for ventilating the interior of a room and controlling an indoor temperature by controlling air that is circulated and returned back and air that is received from the outside.

2. Background

An air conditioner is installed in order to control an indoor temperature by discharging cool or hot air to the interior of a room in order to create a comfortable indoor environment and to provide a more comfortable indoor environment to the human being by purifying indoor air. In general, the air conditioner includes an indoor unit configured to include a heat exchanger and installed indoors and an outdoor unit configured to include a compressor and a heat exchanger and to supply the indoor unit with a refrigerant.

The air conditioner is separated into the indoor unit including the heat exchanger and the outdoor unit including the compressor and the heat exchanger and controlled. The air conditioner operates by controlling power supplied to the compressor or the heat exchanger. Furthermore, in the air conditioner, at least one indoor unit may be connected to the outdoor unit. The air conditioner may operate in cooling or heating mode by supplying a refrigerant to the indoor unit depending on a requested operation state.

The air conditioner performs a cooling operation or a heating operation depending on the flow of a refrigerant. In the cooling operation, when a high-temperature and high-pressure liquid refrigerant is supplied from the compressor of the outdoor unit to the indoor unit through the heat exchanger of the outdoor unit, the refrigerant is expanded by the heat exchanger of the indoor unit and evaporated, an temperature of surrounding air drops, the fan of the indoor unit is rotated, and thus cold air is discharged to the interior of a room. In the heating operation, when a high-temperature and high-pressure gaseous refrigerant is supplied from the compressor of the outdoor unit to the indoor unit, air that is heated by energy emitted as the high-temperature and high-pressure gaseous refrigerant is liquefied in the heat exchanger of the indoor unit is discharged to the interior of a room according to the operation of the fan of the indoor unit.

Recently, such an air conditioner is combined with a ventilation system for discharging indoor air to the outside, receiving external air, and ventilating warm indoor air in addition to control of an indoor temperature by discharging cool or hot air to the interior of a room. In particular, in a building not having a window or having a window of a small size, a system in which a cooling and heating system and a ventilation system have been combined has been in the spotlight.

Accordingly, there is a need for a system for improving heat efficiency by cooling and heating the interior of a room more efficiently and also making an indoor environment more comfortable by circulating internal air and receiving external air.

SUMMARY

An object of the present invention is to provide an air conditioning system configured to provide a comfortable indoor environment by effectively controlling an indoor temperature while circulating air by controlling internal air circulated indoors and the introduction of external air and to add, separate, or remove a required part depending on an indoor environment.

In an aspect of the present invention, an air conditioning system includes an air handling unit (AHU) configured to control outdoor air that is externally supplied, exhaust air that is outdoors discharged, and return air that is circulated indoors and supplied again, control the outdoor air or mixed air of the return air and the outdoor air at a set temperature, and supply cool/warm supply air indoors, at least one outdoor unit configured to supply a heat source for a heat exchange to the AHU, a controller configured to receive the operating state data of the AHU and control the operation of the AHU through communication with the outdoor unit, and an interface unit connected to the controller and configured to output the control menu of the AHU, send data received through the control menu to the controller, and output a monitoring screen for the operating state of the AHU and the outdoor unit.

In another aspect of the present invention, the controller of an AHU configured to control outdoor air that is externally supplied, exhaust air that is outdoors discharged, and return air that is circulated indoors and supplied again, control the outdoor air or mixed air of the return air and the outdoor air at a set temperature using a heat source supplied by an outdoor unit connected to the AHU, and supply cool/warm supply air indoors includes a main unit configured to control the operation of the AHU, an input/output unit connected to devices including a sensor, valve, and damper included in the AHU and configured to transfer the control command of the main unit and input the data of each of devices to the main unit, a communication unit configured to communicate with the outdoor unit, and a driving unit configured to control a rotation operation of a fan included in the AHU, wherein the main unit determines the operating state of the AHU in response to data received from the AHU or the input/output unit and control the operation of the AHU in response to the received data.

The air conditioning system in accordance with an embodiment of the present invention can ventilate the interior of a room by controlling the amount of air that is indoors circulated, discharged air, and air received from the outside, can control an indoor temperature using a temperature of outdoor air, and can control an indoor temperature by performing a heat exchange on mixed air. Accordingly, there are advantages in that heat efficiency can be improved and energy can be reduced. Furthermore, the air conditioning system includes the interface unit connected to the controller for controlling the AHU. Accordingly, there are advantages in that management convenience and efficiency can be improved because the AHU can be easily controlled and the operating state of the AHU is monitored in real time

BRIEF DESCRIPTION OF THE DRAWINGS

Embodiments will be described in detail with reference to the following drawings in which like reference numerals refer to like elements and wherein:

FIG. 12 is an exemplary diagram illustrating a screen when the interface unit in accordance with an embodiment of the present invention stands by.

DETAILED DESCRIPTION

The merits and characteristics of the present invention and a method for achieving the merits and characteristics will become more apparent from embodiments described in detail later in conjunction with the accompanying drawings. However, the present invention is not limited to the disclosed embodiments, but may be implemented in various different ways. The embodiments are provided to only complete the disclosure of the present invention and to allow those skilled in the art to understand the category of the present invention. The present invention is defined by the category of the claims. The same reference numbers will be used to refer to the same or similar parts throughout the drawings.

Hereinafter, embodiments of the present invention are described in detail with reference to the accompanying drawings.

Figure 1:
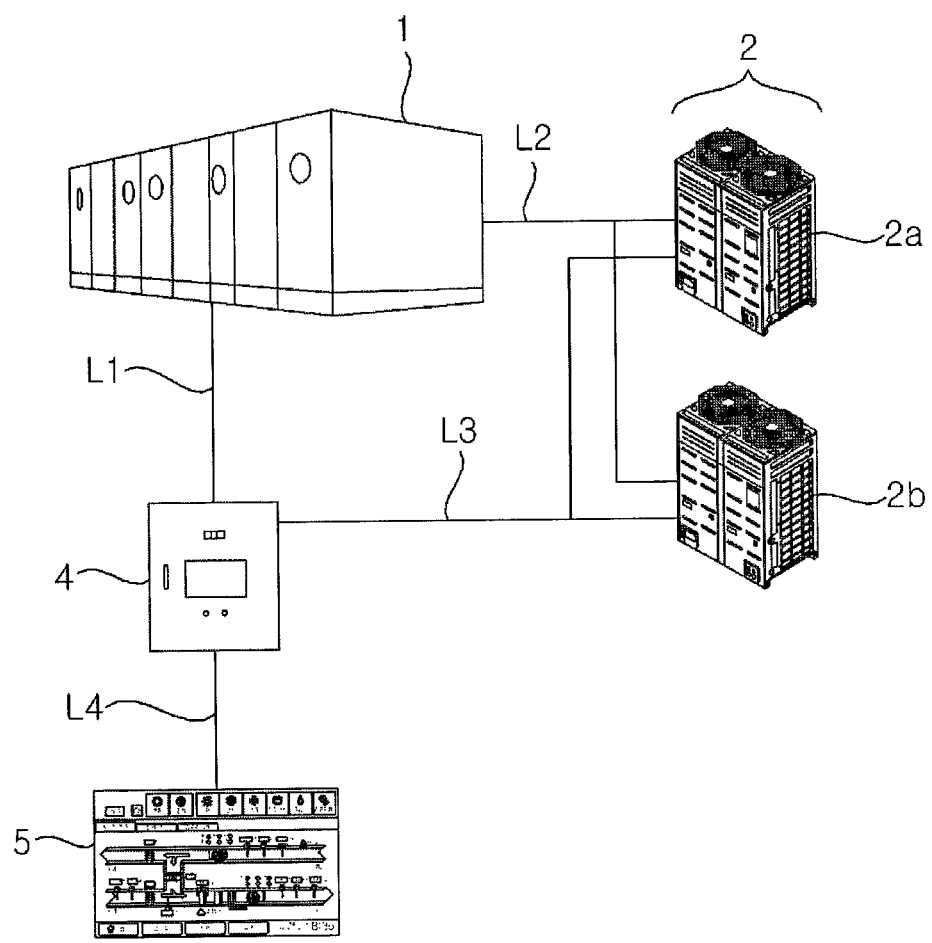
FIGS. 1, 2 and 3 are diagrams illustrating the configuration of an air conditioning system in accordance with an embodiment of the present invention.
Figure 3:
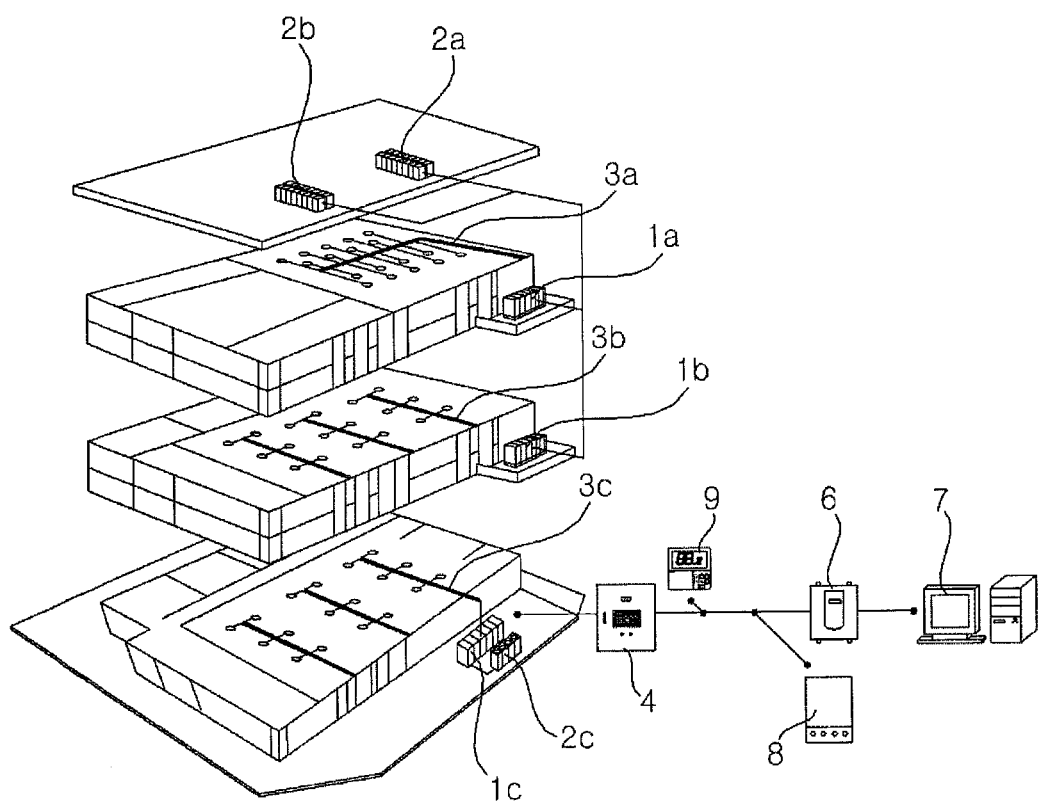

FIGS. 1 and 3 are diagrams illustrating the configuration of an air conditioning system in accordance with an embodiment of the present invention. As illustrated in FIG. 1, the air conditioning system includes an air handling unit (AHU) 1, an outdoor unit 2, a controller 4, and an interface unit 5 connected to the controller 4.

The AHU 1 controls the amount of supply air that is supplied indoors, return air that is circulated and then returned back, outdoor air received from the outside, and exhaust air discharged to the outside and supplies supply air subjected to a heat exchange to the interior of a room.

The outdoor unit 2 operates in cooling mode or heating mode depending on setting and supplies a refrigerant to the AHU 1. In this case, the outdoor unit 2 provides a heat source for the thermal exchange of air in the AHU 1, and another heat source may be used in addition to the outdoor unit. For example, a heat source may be supplied through a heat pump or a geothermal plate.

The outdoor unit 2 includes at least one compressor (not illustrated) configured to compress an introduced refrigerant and discharge a high-pressure gaseous refrigerant, an accumulator (not illustrated) configured to separate a refrigerant into a gaseous refrigerant and a liquid refrigerant so that a liquid refrigerant not gasified is prevented from being introduced into the compressor, an oil separator (not illustrated) configured to recover oil from a refrigerant discharged by the compressor, an outdoor heat exchanger (not illustrated) configured to condense or evaporate a refrigerant through a heat exchange with outdoor air, an outdoor unit fan (not illustrated) configured to introduce air into the outdoor heat exchanger and externally discharge air subjected to a heat exchange in order to further smooth the heat exchange of the outdoor heat exchanger, a four-way valve (not illustrated) configured to change the flow channel of a refrigerant depending on operation mode of the outdoor unit, at least one pressure sensor (not illustrated) configured to measure pressure, at least one temperature sensor (not illustrated) configured to measure a temperature, and a control element configured to control the operation of the outdoor unit and perform communication with other units. The outdoor unit further includes a plurality of sensors, valves, and an overcooling device, and a description thereof is omitted.

The controller 4 controls the driving of the AHU 1 and the degree of circulated air and performs control so that air is supplied at a set temperature. Furthermore, the controller 4 sets a target temperature in the outdoor unit through communication with the outdoor unit 2 or control the driving of the outdoor unit. The controller 4 further drives the outdoor unit depending on the degree of a load or stops part of the outdoor unit that is being driven. The controller 4 is installed in a surface on any one side of a housing of the AHU 1.

The interface unit 5 is connected to the controller 4, and operates as the input unit and output unit of the controller. In this case, the interface unit 5 displays the operating state of the AHU and outdoor unit based on the data of the controller 4, provides control menus for the AHU and the outdoor unit, and sends data received through the control menus to the controller 4. The interface unit 5 displays a graphic-based monitoring screen so that a user easily checks the operating state of the AHU and outdoor unit.

The interface unit 5 generates a report on the operation state of the AHU and the outdoor unit for each specific time, and outputs the report.

Figure 2:
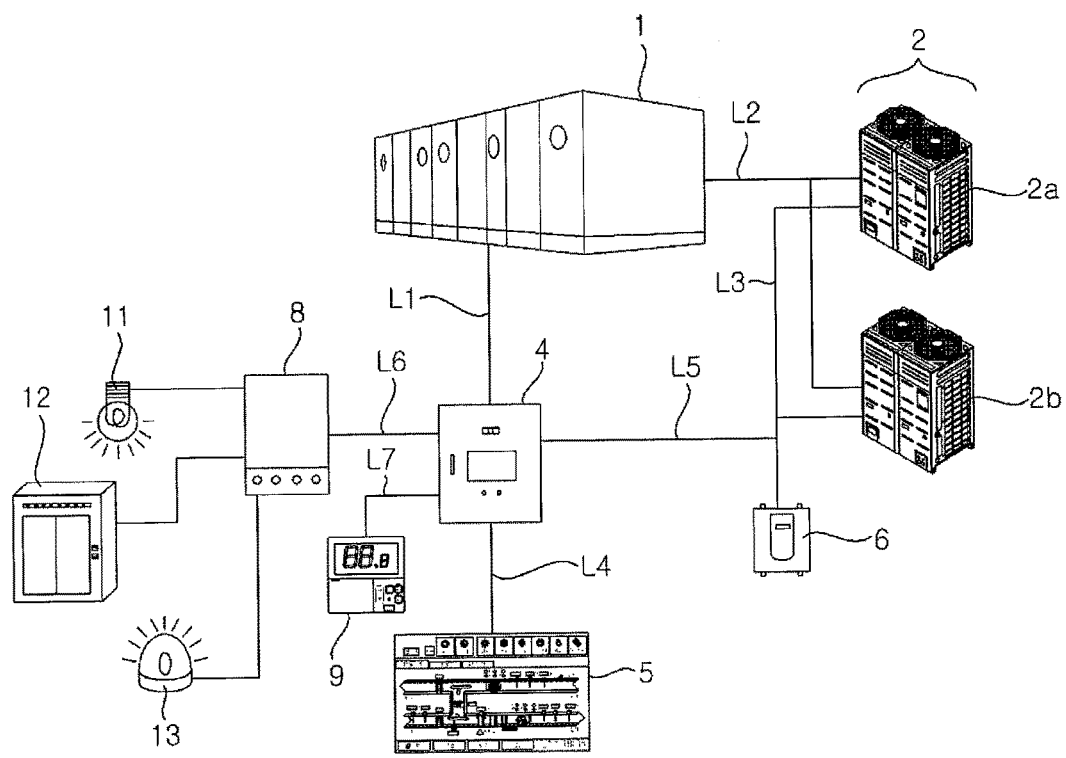

Furthermore, as illustrated in FIG. 2, the air conditioning system is connected to the outdoor unit 2 in addition to the AHU 1, the outdoor unit 2, the controller 4, and the interface unit 5. The air conditioning system further includes a second controller 6 configured to control the outdoor unit, a local controller 9 installed in a room to which air supplied by the AHU 1 is discharged, movement means 12 within a building, a light apparatus 11, a security apparatus 13, and a building controller 8 configured to control an alarm apparatus.

The local controller 9 displays a temperature of each room and information about the operation of an AHU that is now operating, receives a user command through input means included therein, and sends the user command to the controller 4.

The second controller 6 is the central controller of outdoor units connected to the outdoor unit 2 and configured to integrally control the plurality of outdoor units. The second controller 6 controls the operation of the outdoor units, collects information about the operations of the outdoor units, and stores the collected information. The second controller 6 controls the plurality of outdoor units depending on the setting of the controller 4 so that they operate and sends data regarding the operating state of the outdoor units to the controller 4. The second controller 6 may set the operation schedules of the outdoor units in addition to the operations of the outdoor units and performs peak control based on the amount of energy consumed by the outdoor units. If the second controller 6 is not connected as in FIG. 1, the controller 4 communicates with the outdoor units and sends a control command to each of the outdoor units. The outdoor unit sets operation mode and a target temperature in response to a control command and operates.

If input/output means are not included in the second controller, the third controller 7 may be used as means for remotely connecting to the second controller, monitoring data, and inputting a control command.

The building controller 8 controls warning within a building or the security apparatus 13, controls the operation of the movement means 12, such as an elevator or escalator, and controls the light apparatus 11. Specific conversion means is included in the building controller 8 and the controller 4. The specific conversion means mutually converts data using different communication methods or communication standards and performs communication.

For example, when a fire is generated, the building controller 8 drives an alarm unit so that warning is output and simultaneously inputs a fire signal to the controller 4. After receiving the fire signal, the controller 4 stops the operation of a heat source, such as the outdoor unit, and controls a damper so that smoke is externally discharged. Furthermore, when the on/off state of a light is sent to the controller 4, the controller 4 determines whether a person is present in each room or whether a corresponding room is used and may stop temperature control by controlling air supplied to the corresponding room.

As illustrated in FIG. 3, the air conditioning system may include a plurality of the AHU 1 1a to 1c depending on the size and scale of a building. Furthermore, the air conditioning system may include a plurality of heat sources including outdoor units 2 2a to 2c in accordance with the plurality of AHU 1 1a to 1c. The outdoor unit 2 corresponding to the capacity of the AHUs is connected to the AHU 1. In this case, the number of fans included in the AHU may be changed, if necessary. The fans are modulated and configured to be assembled so that they can be easily added or removed. A total amount of circulated air is varied by changing the number of fans.

The AHU 1 is connected to a duct 3 (3a to 3c), and discharges air subjected to a heat exchange to the interior of a room. An indoor temperature in each room may be measured by a sensor installed in each room or the local controller 9. Control means for controlling the direction of discharged air or the amount of wind may be included at the end of the duct 3, that is, an outlet for discharging air to the interior of a room.

The second controller 6, the third controller 7 connected to the second controller 6, and the building controller 8 operate in conjunction with each other. The controller 4 sends and receives data to and from the second and the third controllers 6, 7 and the building controller 8 and outputs corresponding information through the interface unit 5. Furthermore, if the building controller 8 and the second controller 6 are connected and operate in conjunction with each other, data received through the interface unit 5 is sent to the second controller 6 or the building controller 8 through the controller 4 so that a corresponding operation is performed.

Figure 4:
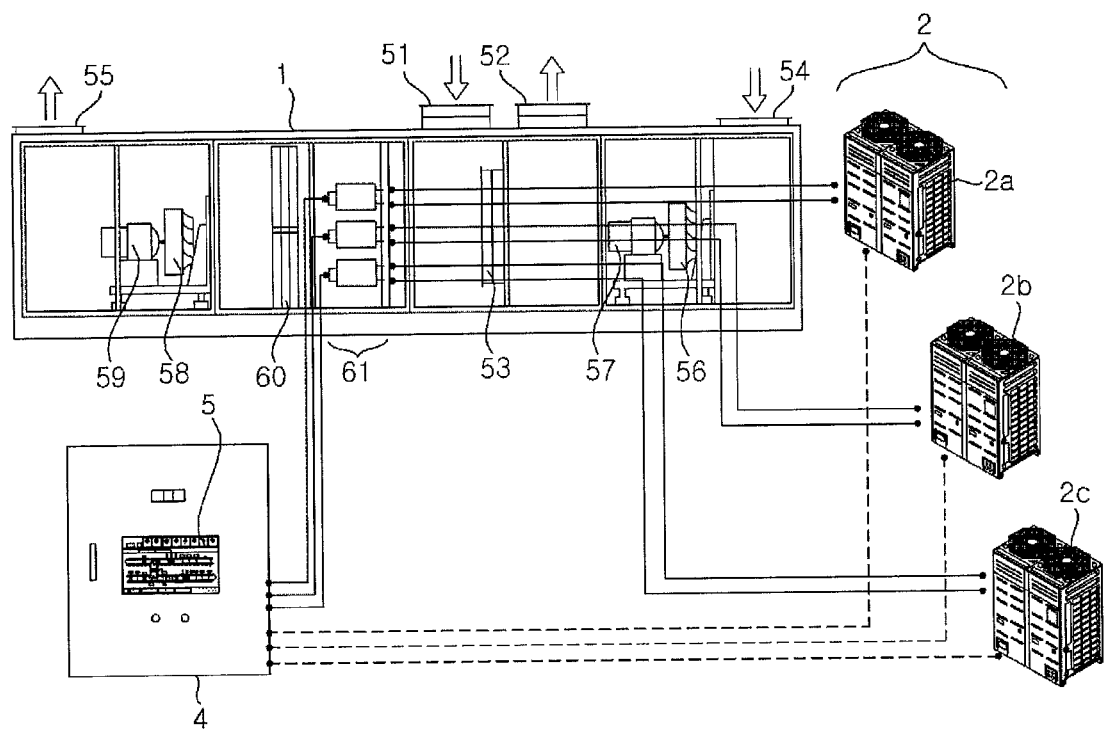
FIG. 4 is a diagram illustrating the configuration of the AHU of the air conditioning system in accordance with an embodiment of the present invention.

FIG. 4 is a diagram illustrating the configuration of the AHU of the air conditioning system in accordance with an embodiment of the present invention. As illustrated in FIG. 4, the AHU 1 may be divided as follows.

The AHU 1 includes a supply air unit configured to supply air to the interior of a room through the duct 3, a return air unit configured to circular and return air indoors, an exhaust air unit configured to discharge air to the outside, an outdoor air unit configured to suck external air, and a heat exchange unit configured to perform a heat exchange on the mixed air of outdoor air or return air and outdoor air. In this case, the units are modulated so that they can be added or removed. Furthermore, the exhaust air unit and the outdoor air unit may be integrated into a single module to form a mixing air unit.

The return air unit is equipped with a fan 56 for sucking return air that is returned back. The supply air unit is equipped with a fan 58 configured to supply outdoor air or mixed air to the interior of a room through the duct. In this case, the fans 56, 58 respectively included in the return air unit and the supply air unit are connected to respective fan motors 57, 59 and rotated in response to a control command from the controller 4. Accordingly, air flows. Each of the fan motors 57, 59 included in the return air unit and the supply air unit is an inverter motor that operates according to a set frequency. The fan motor turns on/off each fan and also controls the rotation speed of the fan. Each of the return air unit and the outdoor air unit may be equipped with 1 to 6 fans. The fans may independently operate. In this case, the fans may be modulated as described above so that they can be easily added, separated, and removed.

The fan motor included in each of the return air unit and the supply air unit is driven by a driving unit (not illustrated). The controller 4 applies a control command to the driving unit. The driving unit controls the fan motor in response to the control command so that the fan is rotated.

The outdoor air unit is equipped with a first damper 51 configured to control the degree of external air that is introduced. Furthermore, the exhaust air unit is equipped with a second damper 52 configured to discharge some of or the entire return air that is circulated and then returned back. The amount of externally discharged air is determined by the open angle of the damper. Furthermore, a third damper 53 is provided between the outdoor air unit and the exhaust air unit, and performs control so that some of or the entire return air is supplied as supply air. The controller 4 controls the opening angle of each of the first to the third dampers 51 to 53.

The third damper 53 and the first and the second dampers 51, 52 between the outdoor air unit and the exhaust air unit are opened or closed through a mutual cooperation. In this case, as the fans included in the return air unit and the supply air unit are rotated, air flows, and the flow channel of air is determined by the degree of opening/shutting of the damper. Accordingly, exhaust air and outdoor air are controlled by pressure within the AHU.

For example, if the third damper 53 is open about 67 degrees so that 70% of return air is supplied as supply, the second damper 52 of the exhaust air unit is open 23 degrees, and thus return air of 30% is externally discharged. In this case, the first damper 51 is open 23 degrees, and thus outdoor air is supplied. If 70% of return air is supplied as supply air and 30% thereof is externally discharged as exhaust air, outdoor air of 30% corresponding to the discharged air is supplied by internal pressure. Accordingly, the supply air becomes mixed air including the return air of 70% and the outdoor air of 30%.

Furthermore, if the third damper 53 is closed, the second damper 52 is open 90 degrees, and the first damper 51 is open 90 degrees, return air is externally discharged as the entire exhaust air, and outdoor air of 100% is supplied to the interior of a room. Hereinafter, outdoor air supplied as supply air of 100% is called full outdoor air.

If the AHU 1 does not include the return air unit and includes the outdoor air/exhaust air units, the heat exchange unit, and the supply air unit, only outdoor air operates as full outdoor air that is supplied as supply air without return air that is circulated and returned back.

Full outdoor air or mixed air is subject to a heat exchange through the heat exchange unit and supplied to the interior of a room as cold air through the supply air unit. The heat exchange unit is equipped with a heat exchanger 60 and an expansion valve 61. The controller 4 sets a target temperature in the outdoor unit 2 2a to 2c and controls the expansion valve so that full outdoor air or mixed air has a specific temperature based on the set target temperature. A refrigerant supplied by the outdoor unit 2 is introduced into the heat exchanger through the expansion valve. Accordingly, full outdoor air or mixed air that passes through the heat exchanger is subject to a heat exchange, thus becoming air of a specific temperature. In this case, the heat exchanger may have a water cooling type, an air cooling type, or a type in which the two types are combined.

The controller 4 may control a temperature of supply air supplied to the supply air unit to an indoor temperature depending on any one of a supply air method or a return air method or may control a temperature using a temperature of return air that is circulated and returned back as an indoor temperature. That is, in the supply air method, supply air is supplied so that a temperature of the supply air is a target temperature. In the return air method, temperature control according to a target temperature is performed based on a temperature of return air.

In this case, the interface unit 5 inputs data to the controller 4 and outputs the operating state of the AHU 1 and the flow of air to a monitoring screen based on the data stored in the controller 4.

Figure 5:
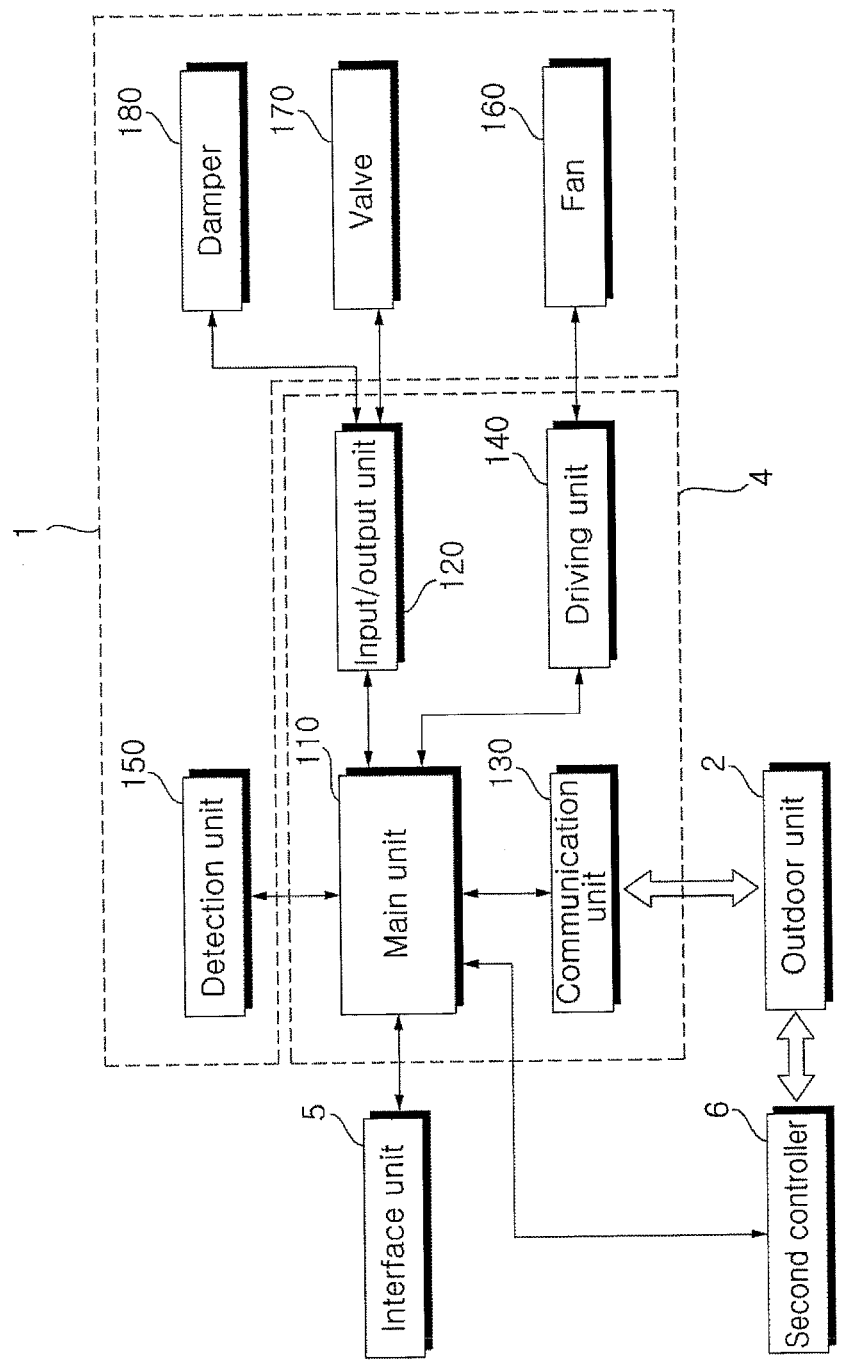
FIG. 5 is a block diagram illustrating the control elements of the air conditioning system in accordance with an embodiment of the present invention.

FIG. 5 is a block diagram illustrating the control elements of the air conditioning system in accordance with an embodiment of the present invention. As illustrated in FIG. 5, the operation of the air conditioning system is controlled by the controller 4. The air conditioning system may further include the second controller 6 or the third controller 7 for integrally controlling the outdoor unit in addition to the controller 4. The building controller 8 is connected to the second controller 6 or the third controller 7, which operate in conjunction with each other.

The controller 4 includes a main unit 110, an input/output unit 120, a driving unit 140, and a communication unit 130.

Furthermore, the controller 4 is connected to the interface unit 5, and communicates with the interface unit 5. Accordingly, the interface unit 5 operates as the input/output device of the controller 40. The interface unit 5 is configured to be attached to or detached from the controller 4.

The input/output unit 120 is connected to the AHU 1. The input/output unit 120 transfers a control signal for controlling each of elements included in the AHU 1 and inputs information about the state of each element of the AHU 1 to the main unit 110.

The input/output unit 120 is equipped with a plurality of data ports, and the data ports are connected to the AHU.

In particular, the input/output unit 120 is connected to the damper 180 and valve 170 of the AHU 1. The input/output unit 120 transfers the control signal of the main unit 110 to the damper 180 and the valve 170 and inputs data regarding the operating state of the damper 180 and the valve 170 to the main unit 110.

The driving unit 140 controls the fan 160 of the AHU 1. The driving unit 140 includes an inverter and an inverter driver and controls a fan motor so that a fan is rotated. The driving unit 140 may be installed within the controller 4, may be installed outside the controller 4, or may be separately installed near the fan according to circumstances.

The communication unit 130 sends and receives data to and from the controller 4 and outside devices. The communication module 130 includes a plurality of wired or wireless communication modules, communicates with devices connected thereto through the plurality of wired or wireless communication modules, connects to an external server (not illustrated) or a remote terminal (not illustrated) through Internet connection, and sends and receives data to and from the external server or the remove terminal.

The main unit 110 controls an overall operation of the AHU 1. The main unit 110 receives data from the outdoor unit 2 and sends data to the outdoor unit 2 through the communication unit 130. The main unit 110 controls the AHU 1 depending on the operating state of the outdoor unit 2.

Furthermore, the main unit 110 sends a control signal through the input/output unit 120 and receives data regarding the damper 180 and the valve 170.

The main unit 110 includes a plurality of input/output terminals separately from the input/output unit 120 and receives data from a detection unit 150, that is, a plurality of sensors included in the AHU 1. Furthermore, the main unit 110 is directly connected to the interface unit 5 and also connected to the second controller 6 or the building controller 8. In this case, the second controller 6 or the building controller 8 may perform communication through the communication unit 130 in accordance with a communication method.

Furthermore, the main unit 110 includes memory for storing data. The memory stores data according to an operation of the main unit 110, data for the transmission and reception of data to and from the input/output unit 120, the driving unit 140, and the communication unit 130, data transmitted and received through the input/output unit 120 and the detection unit 150, data transmitted and received through the communication unit 130, control data for controlling the AHU 1, and data for the setting of the operation of the AHU.

The memory may include one or more magnetic disk storage devices, flash memory devices, or non-volatile memory, such as non-volatile solid-state memory devices, but is not limited thereto. For example, the memory may include a readable storage medium.

The main unit 110 determines the operating state of the AHU 1 based on data received through the detection unit 150 and the input/output unit 120 and controls the operation of the AHU 1 based on the received data. The main unit 110 generates control signals and controls the damper 180, valve 170, and fan 160 of the AHU 1 by applies the control signals to the input/output unit 120 and the driving unit 140.

Furthermore, the main unit 110 sets the operation of the AHU 1 based on data received from the interface unit 5 and sends data regarding the operating state of the AHU 1 or the outdoor unit 2 to the interface unit 5 so that the data is output.

The main unit 110 is equipped with a specific display and at least one button separately from the interface unit 5. An input for basic setting for the main unit or each of the units within the controller 4 is possible through the button, and brief information is displayed through the display. If the interface unit 5 is detachably connected to the controller 4, data may be inputted through the display and the button, but data according to control setting may be basically received through the interface unit 5.

Figure 6:
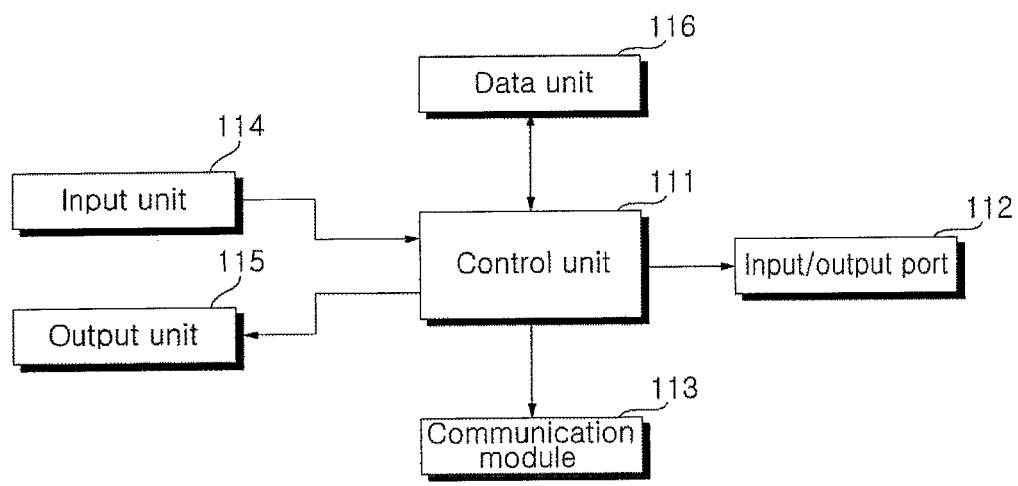
FIG. 6 is a block diagram illustrating the configuration of the interface unit of the air conditioning system in accordance with an embodiment of the present invention.

FIG. 6 is a block diagram illustrating the configuration of the interface unit of the air conditioning system in accordance with an embodiment of the present invention. As illustrated in FIG. 6, the interface unit 5 includes an input unit 114, an output unit 115, a data unit 116, a communication module 113, an input/output port 112, and a control unit 111 configured to control an overall operation of the interface unit 5.

The communication module 113 is responsible for the transmission and reception of data between the main unit 110 and the interface unit 5. The communication module 113 is connected to the main unit 110 through a communication line.

The communication module 113 performs communication using a serial communication method, such as RS485 communication, for example. As described above, the main unit 110, the input/output unit 120, the driving unit 140, and the communication unit 130 also send and receive data each other using a serial communication method.

The communication module 113 may further include wireless communication means, such as a short-distance communication module for communication with an external terminal (not illustrated).

The input/output port 112 includes a terminal on which external memory is mounted and may further include a connection terminal that may be connected to external devices through a cable.

The input unit 114 includes at least one button or switch and specific input means, such as a touch pad. When the input means is manipulated, the input unit 114 generates a specific key input signal and inputs it to the control unit 111.

For example, the input unit 114 may include a button, a switch, a keypad, a dome switch, a touch input unit (capacitive/resistive), and/or a jog wheel. In particular, if the input unit 114 forms a mutual layer structure along with the display means of the output unit 115, this may be called a touch screen.

The output unit 115 includes the display means for outputting alphabetical and numerical letters, special characters, and images, a speaker or buzzer for generating specific sound effects or alarms, and at least one lamp for indicating whether various states will be emitted, colors, and flickering state.

The output unit 115 implements data received from the controller 4 in the form of a graphic-based monitoring screen and outputs the data to the display means. When the input means of the input unit 114 is manipulated, the output unit 115 outputs a corresponding menu screen.

The data unit 116 stores data for outputting the monitoring screens of the AHU and the outdoor unit, data for setting the operation of the AHU, and data received from the controller 4 and also stores data that is received through the input unit 114 and that is to be sent to the controller 4.

The control unit 111 processes input/outputted data, controls the transmission and reception of data through the communication module 113 and the input/output port 112, generates a control signal according to the key input signal of the input unit 115, sends the control signal to the controller 4, and performs control so that a screen corresponding to an input signal is output through the output unit 115.

Furthermore, the control unit 111 analyzes data received from the controller 4 so that the operation state of the AHU 1 and the outdoor unit is displayed in the form of a monitoring screen through the output unit 115. In this case, the control unit 111 performs control so that the monitoring screen is changed and displayed in real time in response to received data and performs control so that a menu screen corresponding to a key input signal is displayed.

The control unit 111 monitors the connection state with the controller 4 connected thereto through the communication module 113 and outputs warning through the output unit 115 when the connection of the controller 4 is released.

Figure 7:
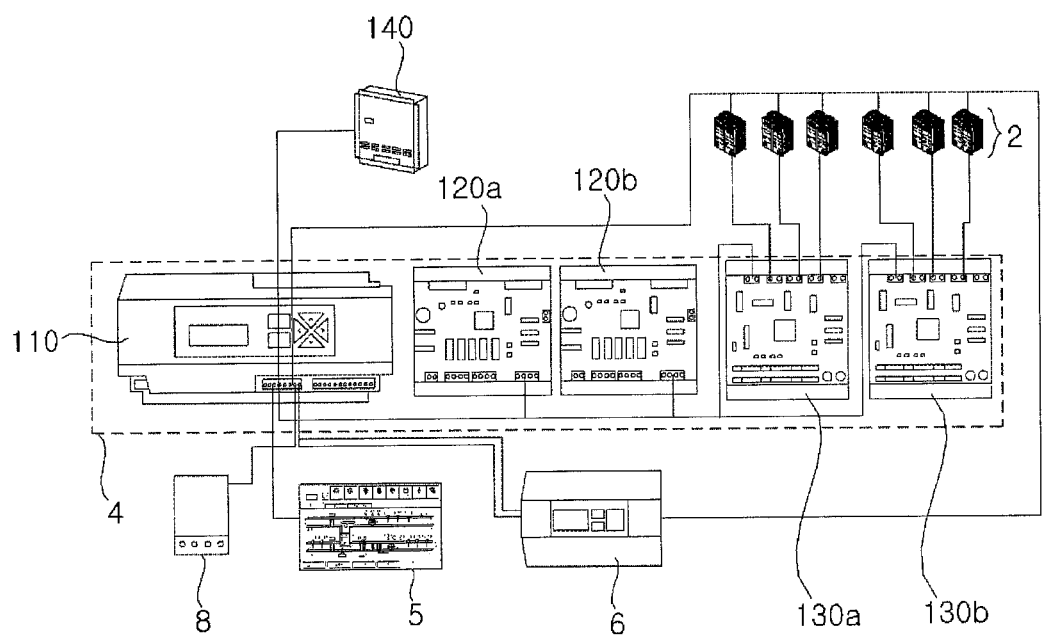
FIG. 7 is a diagram illustrating a plurality of modulated units that form the controller and the air conditioning system connected to the modules in accordance with an embodiment of the present invention.

FIG. 7 is a diagram illustrating a plurality of modulated units that form the controller and the air conditioning system connected to the modules in accordance with an embodiment of the present invention.

As illustrated in FIG. 7, the units forming the controller 4 are modulated and interconnected.

The main unit 110, input/output unit 120, driving unit 140, and communication unit 130 of the controller 4 and the interface unit 5 are interconnected through communication lines, and they sends and receives data each other. For example, data may be transmitted and received using a serial communication method, such as RS485, in accordance with the communication standard of the air conditioning system. In this case, each of the units of the controller 4 is equipped with a communication module for internally sending and receiving data each other separately from the communication unit 130.

In this case, the units of the controller 4 is added or removed for each module.

For example, if the configuration of the AHU 1 is changed, the input/output unit 120, the driving unit 140, and the communication unit 130 may be added to the controller 4, or some of the input/output unit 120, the driving unit 140, and the communication unit 130 may be removed from the controller 4. That is, if a fan is additionally installed to the AHU 1, a driving unit for driving the fan is additionally installed depending on the number of added fans, and the added driving unit is connected to the main unit 110 through a communication line.

Accordingly, the controller 4 includes the main unit 110, a first input/output unit 120*a*, a second input/output unit 120*b*, a first communication unit 130*a*, a second communication unit 130*b*, and the driving unit 140. In some embodiments, the driving unit 140 may be separated from the controller 4 and installed near the AHU.

The communication unit 130 may be added depending on the number of connected outdoor units 2, and thus the communication unit 130 may include the first communication unit 130*a* and the second communication unit 130*b*. The communication unit 130 performs the transmission and reception of data to and from each of the connected outdoor units. If the number of connected outdoor units is increased, the third communication unit 130 may be additionally installed.

Furthermore, the input/output unit 120 may be additionally installed depending on the number of devices installed in the AHU, and thus may include the first input/output unit 120*a* and the second input/output unit 120*b*.

As described above, data that is transmitted and received or inputted and output is transmitted to the main unit 110 through an internally connected communication line.

Furthermore, the interface unit 5, the second controller 6 connected to the outdoor unit 2, and the building controller 8 connected to the movement means and the light apparatus are directly connected to the main unit 110.

The interface unit 5 is connected to the main unit 110 through a communication line, and communicates with the input/output unit 120 and the communication unit 130 using the same serial communication method.

The main unit 110 may send and receive data to and from the second controller 6 and the building controller 8 using a communication method that is the same as or different from a communication method within the controller 4 in accordance with the communication method of each controller.

Figure 8:
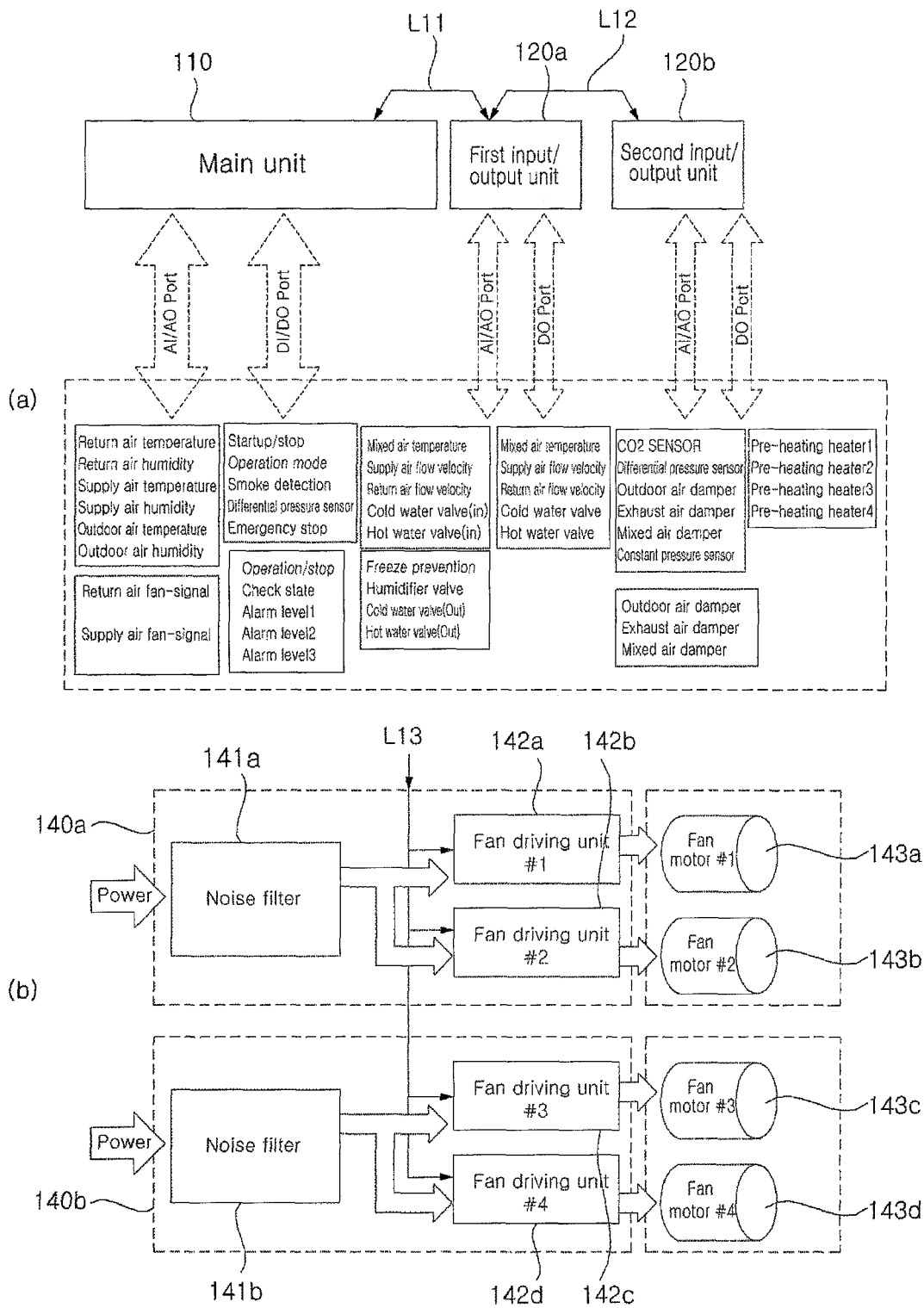
FIG. 8 is a diagram illustrating the flow of a signal for each unit in the controller in accordance with an embodiment of the present invention.

FIG. 8 is a diagram illustrating the flow of a signal for each unit in the controller in accordance with an embodiment of the present invention.

As illustrated in FIG. 8(a), the main unit 110 is connected to the detection unit 150 of the AHU 1, that is, a plurality of sensors, through an input/output terminal, and receives data measured by the AHU 1.

In this case, the main unit 110 includes both an analog input/output terminal and a digital input/output terminal. The main unit 110 receives the measured value of a temperature and humidity from each of the sensors, data regarding start-up in related to the operation state of the AHU 1, operation mode, and the detection of smoke, the measured value of a differential pressure sensor, and data regarding whether emergency has occurred.

The main unit 110 receives a return air temperature, return air humidity, a supply air temperature, supply air humidity, an outdoor air temperature, and outdoor air humidity through the analog input/output terminal. In this case, if a humidity sensor is not installed, a humidity value is not received. The main unit 110 receives the fan signals of a return air fan and a supply air fan.

Furthermore, the main unit 110 receives data regarding start-up or stop, operation mode, and the detection of smoke, the data of a differential pressure sensor, and a signal regarding an emergency stop through the digital input/output terminal and also receives data for checking the state and a signal regarding the grade of an alarm.

The input/output unit 120 receives data regarding a temperature, a flow velocity, a valve, a damper, and a heater from each of the first and the second input/output units 120a, 120b and sends the data to the main unit 110.

The first input/output unit 120a receives a temperature of mixed air, a supply air flow velocity, a return air flow velocity, the input/output pressure of a hot water valve and a cold water valve, data according to the opening/shutting of a valve, data regarding whether freeze prevention has been set, and data regarding a humidifier valve.

The second input/output unit 120b receives data measured by a carbon dioxide ($CO_2$) sensor, a differential pressure sensor, and a constant pressure sensor, data regarding the open angle of the first damper 51 that is an outdoor air damper, the second damper 52 that is an exhaust air damper, and the third damper 3 that is a mixed air damper and also receives data from a preheating heater.

In this case, whether data will be input is changed depending on whether a humidifier and the preheating heater are installed in the AHU 1. If other devices are installed, the data of the installed devices may be received through the input/output unit 120.

As illustrated in FIG. 8(b), the driving unit 140 may be additionally installed depending on the number of fans installed in the AHU 1, and controls the fans associated with the first driving unit 140a and the second driving unit 140b. The first and the second driving units 140a, 140b are connected to the main unit 110 through a communication line L13, and communicate with the main unit 110.

The driving unit 140 includes noise filters 141a, 141b for filtering supplied power and includes fan driving units 142a to 142d for receiving filtered power and driving fan motors 143a to 143d.

The first to the fourth fan driving units 142a to 142d are respectively connected to the first to the fourth fan motors 143a to 143d, and control the fan motors 143a to 143d, that is, inverter motors. Each of the fan driving units includes an inverter and an inverter driver. Accordingly, the fans may independently operate depending on different setting. In this case, each fan may operate at different rotation speed in response to the control command of a fan driving unit connected thereto.

Two fan driving units are connected to each of the noise filters. The fan motors are connected to the respective fan driving units. Since two fans are connected to each of the driving units, fans may be added to or removed from the AHU 1 every two fans. Furthermore, since two fans are connected to a driving unit, and they operate depending on different setting, the operation of an abnormal fan is stopped and the remaining fan normally operates if abnormality occurs in one of the fans. In this case, the abnormal fan may be rotated according to an air current due to the influence of the normal fan. Accordingly, when an error occurs, the driving unit 140 prevents the abnormal fan from rotating through electrical or physical locking.

Furthermore, the interface unit 5 is mounted on the controller 4 and detachably configured in the controller 4. In this case, the interface unit 5 is basically connected to the controller 4 through a communication line, but may send and receive data using a wireless communication method according to circumstances.

In general, the AHU 1 is installed at the rooftop of a building or an underground machine room. Accordingly, the administrator or user of the AHU 1 has to check the operation state of the AHU 1 in the machine room or management office and control the AHU. However, since the interface unit 5 is detachable, the operation state of the AHU 1 can be checked and the AHU can be controlled without separate equipment or an additional task regardless of the place.

Figure 9:
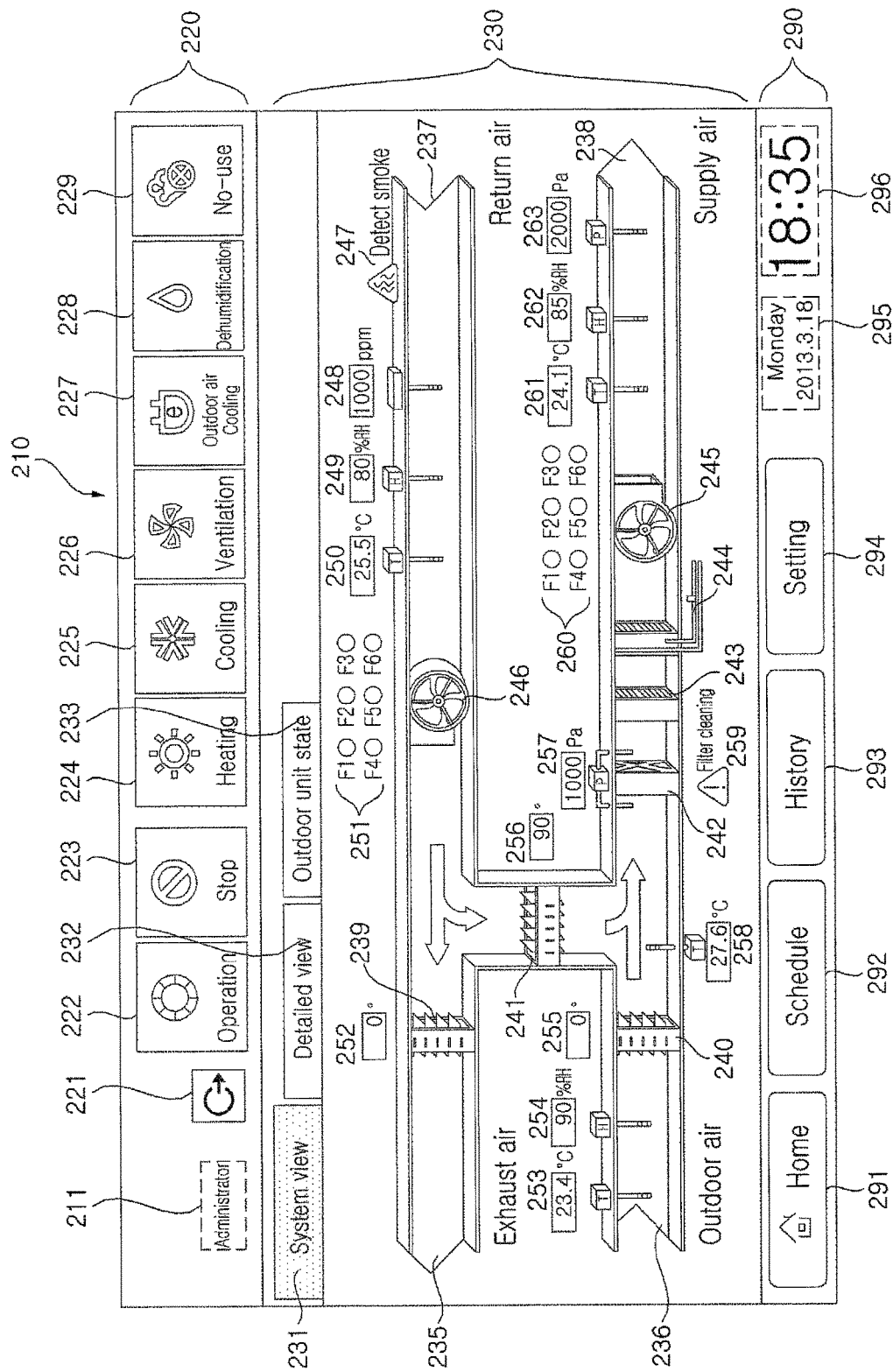
FIGS. 9 to 11 are exemplary diagrams illustrating display screens of the interface unit of the air conditioning system in accordance with an embodiment of the present invention.
Figure 10:
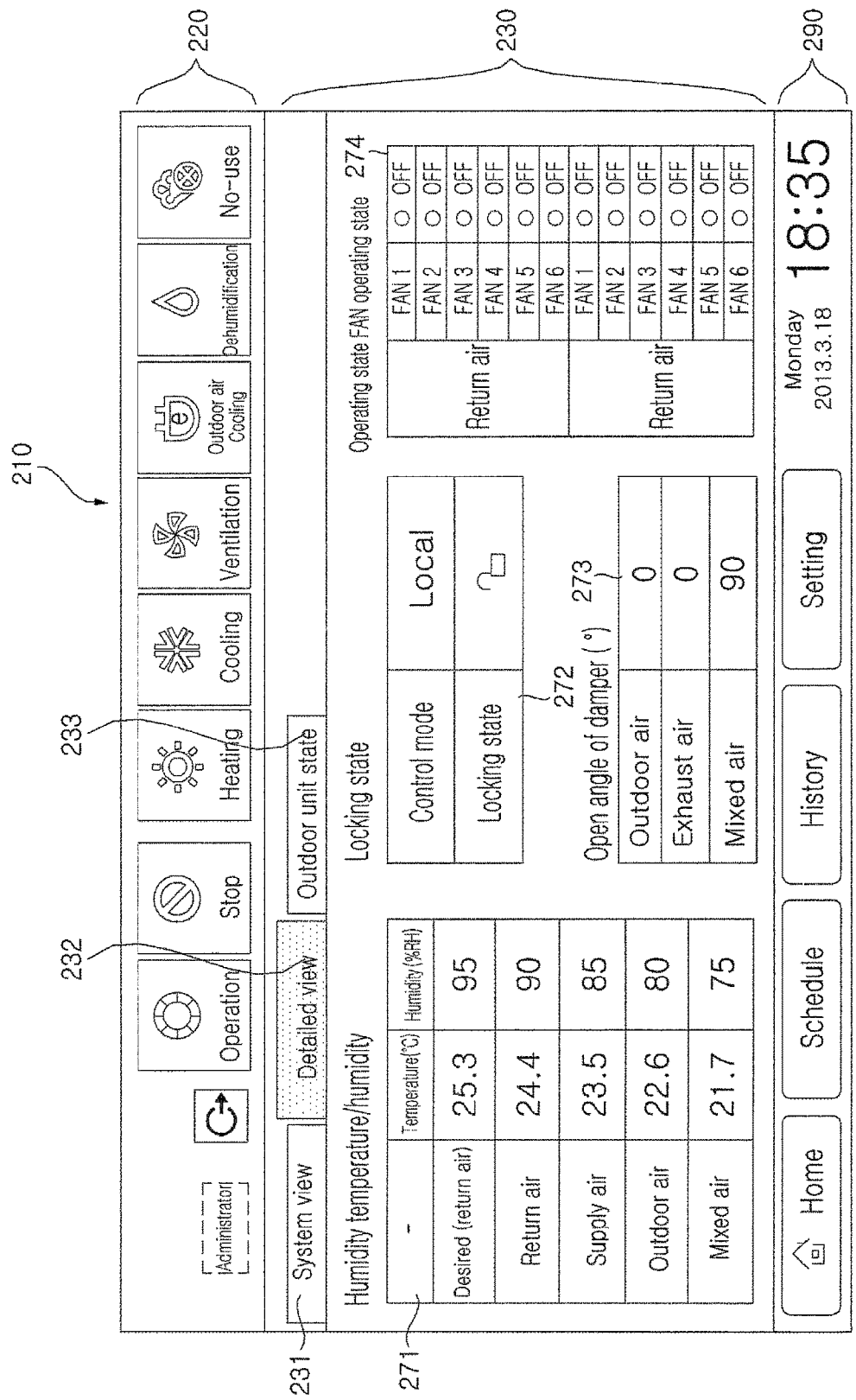
Figure 11:
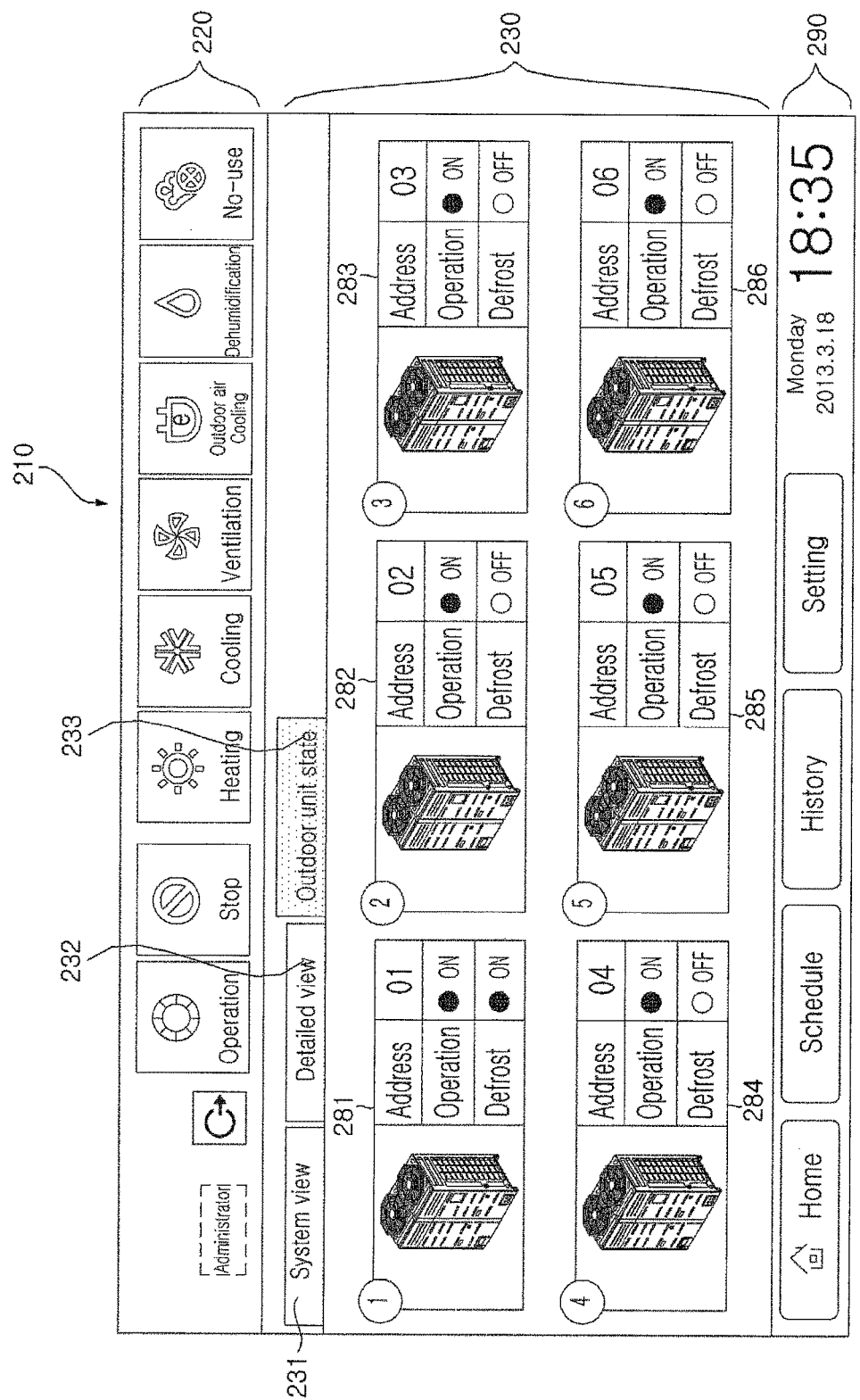

FIGS. 9 to 11 are exemplary diagrams illustrating display screens of the interface unit of the air conditioning system in accordance with an embodiment of the present invention.

FIG. 9 illustrates a monitoring screen 210 illustrating the system state of the interface unit.

Data received by the controller 4 is stored in the memory of the main unit 110 of the controller 4.

The main unit 110 sends the stored data to the interface unit 5. The interface unit 5 analyzes the data received from the controller 4 and displays the monitoring screen 210 of the AHU 1 on the output unit 115 as illustrated in FIG. 9. In this case, the interface unit 5 is equipped with a program for analyzing the data and implementing the analyzed data in graphics.

The control unit 111 of the interface unit 5 analyzes data received from the controller 4 based on the data of the AHU 1, implements the graphic-based monitoring screen 210 based on information about the structure of the AHU 1, and displays the implemented monitoring screen 210 through the output unit 115.

The control unit 111 performs control so that actually measured data values are displayed on the screen based on data, a temperature, humidity, and information about the state of the valves and a start-up state that are measured by the AHU 1. For example, a supply air temperature and an intake temperature may be displayed in the form of numerical values. The data value may be displayed in the form of at least one of numerical and alphabetical letters and special symbols and a combination of them.

The control unit 111 includes images or icon data corresponding to each of parts and devices installed in the AHU 1 and performs control so that a corresponding image or icon is displayed in a region corresponding to the place where a part and device of the AHU 1 are actually installed based on information about the location. Furthermore, the control unit 111 displays the flow of air on the monitoring screen 210.

The control unit 111 performs control so that the shape of a corresponding image or icon is changed and displayed based on received data. Accordingly, the operating state of each device is displayed in the form of an icon or image. For example, in the case of a fan that normally operates, an image may be displayed in a form in which the fan is rotated. In the case of a fan in which a failure has occurred, a different color may be displayed in a stopped state. For example, the fan may be displayed in black or a separate alarm may be added and displayed An operation menu 220 is displayed at the top of the monitoring screen 210 displayed on the output unit 115 of the interface unit 5. A main menu 290 is displayed at the bottom of the monitoring screen 210. A main screen is displayed in the middle of the monitoring screen 210. In a monitoring state, a monitoring menu 230 is displayed on the main screen. In this case, when any one of the operation menu 220 at the top and the main menu 290 at the bottom is selected, corresponding data is displayed on the main screen. In this case, a selected key in the operation menu 220 and the main menu 290 is displayed with a color different from that of another key. For example, when a home key 291 is selected and an operation 222 and heating 224 are selected, a corresponding main screen is displayed. Furthermore, the home key and the heating key are displayed with a color or letter size different from that of another key in order to provide notification that they have been selected.

Information 211 about a user who is now accessed, a power key 221, an operation key 222, a stop key 223, a heating key 224, a cooling key 225, a ventilation key 226, an outdoor air cooling key 227, a dehumidification key 228, and an additional function key 229 are displayed in the operation menu 220.

The user information 211 displays information about a user who has logged in to the interface unit 5. For example, the user may be divided into an installer, an administrator, and a user, a displayed name can be changed, and a separate ID or icon may be displayed instead of the name.

The power key 221 is a login key. If the power key 221 is selected in a login state, information about a user who is now logged in is logged out. If the power key 221 is selected in a logout state, a login menu may be displayed on the main screen at the center or a new window is created and displayed.

When the operation key 222 is selected by a key button in the operation state, the AHU 1 starts an operation. When the stop key 223 is selected, the operation of the AHU 1 in the operation state is stopped. In this case, if the AHU 1 is in the stop state, the operation key 222 is activated, and the stop key 223 is activated only when the AHU 1 is in the operation state. When the operation key 222 is selected, the control unit 111 sends a corresponding control signal to the controller 4. The controller 4 controls the AHU 1 in response to the control signal.

The heating key 224, the cooling key 225, the ventilation key 226, the outdoor air cooling key 227, and the dehumidification key 228 correspond to operation mode. The AHU 1 is set so that it operates in heating mode, cooling mode, ventilation mode, outdoor air cooling, and dehumidification mode through the heating key 224, the cooling key 225, the ventilation key 226, the outdoor air cooling key 227, and the dehumidification key 228.

For example, when the cooling key 225 is selected, the AHU 1 operates in cooling mode. In this case, the control unit 111 sends a control signal for the cooling mode setting to the controller 4. The controller 4 controls the AHU 1 so that it operates in cooling mode and also controls a heat source, that is, the outdoor unit 2, so that it is operates in cooling mode. In this case, after the control unit 111 sends a control signal in response to the selection of the cooling key 224, if the AHU 1 still remains in another operation mode, for example, ventilation mode based on data received through the controller 4, the control unit 111 displays operation mode on the main screen to be ventilation mode. If the AHU 1 switches to cooling mode, the control unit 111 displays operation mode on the main screen to be cooling mode. Furthermore, the control unit 111 may activate or deactivate a specific key in accordance with a device installed in the AHU 1 and display the specific key. For example, if temperature/humidity sensors are not included in the return air unit or the outdoor air unit, the outdoor air cooling key 227 is deactivated and becomes a state in which it cannot be selected because a cooling operation may not be performed using only outdoor air.

Furthermore, the additional function key 229 is a menu for setting the additional functions of the AHU 1, such as humidification and automatic return air. An operation for a corresponding device is set in accordance with a device installed in the AHU 1.

Contents displayed on the additional function key 229 may be changed depending on selected setting. Contents displayed on the additional function key 229 are changed in order of humidification, automatic return air, humidification, automatic return air, and no-use depending on the number of keys selected.

If a humidification function is not included in the AHU 1, that is, if a humidifier is not installed in the AHU 1, the humidification function cannot be selected. Furthermore, if a carbon dioxide sensor is not installed in the AHU 1, an automatic return air function cannot be selected because it is deactivated. Although a deactivation function is selected, contents may automatically switch to no-use because the control unit 111 is unable to set the deactivation function. Furthermore, if operation mode is selected as dehumidification or outdoor air cooling, humidification and automatic return air cannot be set.

If a humidification function is not used although it is included or if automatic return air is not performed, no-use may be set.

A home key 291, a schedule key 292, a history key 293, and a setting key 294 are displayed in the main menu 290 at the bottom. A date and day-of-the-week 295 and a time 296 are displayed on the right of the main menu 290.

The home key 291 displays a home screen on the main screen. The monitoring menu 230 of the AHU 1 and the outdoor unit 2 in the operation state is displayed as the home screen.

The schedule key 292 is used to set the operation schedule of the AHU 1. The history key 293 displays the operation history and failure history of the AHU 1. The setting key 294 displays setting menus for controlling the AHU 1 on the main screen. Furthermore, the setting key 294 displays setting menus for the operation of the interface unit 5 on the main screen. For example, setting, such as screen brightness, may be changed.

Furthermore, when the date and day-of-the-week 295 or the time 296 is selected, a menu in which the time of the system can be changed is displayed.

The main screen displays a plurality of tabs 231, 232, 233 depending on displayed data, and thus data is changed and displayed in accordance with a selected tab. The monitoring menu 230 is divided into three tabs: a system view tab 231, detailed view tab 232, and an outdoor unit state tab 233 and displayed.

The system view tab 231 is basically selected and displayed on the main screen when the home key 291 is selected. The system view tab 231 displays the operating state of the AHU 1 in the monitoring menu 230 in real time.

The monitoring menu 230 displays the flow of air using an arrow and displays return air 237, exhaust air 235, outdoor air 236, and supply air 238 according to the intake and exhaust of air. Furthermore, the monitoring menu 230 displays each of a device, a damper, a valve, a sensor, and a filter in the form of an image or icon and displays a corresponding data value on a screen.

In this case, an image or icon of each device is displayed in a form corresponding to an actually installed device and disposed in a screen so that it corresponds to an actual location. Furthermore, in the case of a moving device, the movement of the device is displayed in such a manner that a corresponding image or icon is varied in response to the moving device. If abnormality is generated, a separate alarm is output, and an image or icon according to the generation of an error may be added and displayed on a screen or a corresponding color is changed and displayed.

Since a smoke detection sensor is provided on the part of the return air 237, a smoke detection icon 247 is displayed. Images of a concentration 248, humidity 249, and a temperature sensor 250 are displayed, and corresponding data values are indicated by 1000 ppm, 80%, and 25.5 degrees. In this case, the detection of smoke is displayed when smoke generated due to a fire is detected by the smoke detection sensor, or whether smoke has been detected is displayed by displaying a different color. A concentration sensor measures a concentration of carbon dioxide and may determine whether automatic return air will be performed based on a concentration of carbon dioxide in return air that is indoors circulated and then returned back. Accordingly, the degree of outdoor air and exhaust air can be determined.

Furthermore, a return air fan 246 is displayed, and the operating state 251 of each of the return air fans is displayed over the return air fan 246. If six return air fans 246 are included, they are indicated by F1 to F6. The state of the fan is indicated with green, white, or red in accordance with an operating state, such as an operation, stop, or error.

An exhaust air damper (second damper) 52 239 is displayed on the part of the exhaust air 235. If some of return air becomes exhaust air, the open amount 252 of a damper is displayed on the part of the exhaust air damper (second damper) 52 239. Furthermore, an outdoor air damper (first damper) 51 240 is displayed on the part of the outdoor air 236, and the open amount 255 of the outdoor air damper for controlling introduced outdoor air is displayed. A temperature 253 and humidity 254 of introduced outdoor air are displayed on the part of the outdoor air 236. A temperature and humidity sensor on the outdoor air side is installed outside the outdoor air damper, and measure an external temperature and external humidity. Accordingly, an external temperature and external humidity can be measured even in the state in which the outdoor air damper has been closed.

If the open angle of the exhaust air damper 52 239 is 0, it means that return air 100% is supplied as supply air in the state in which the exhaust air damper has been closed. In this case, the open angle of the outdoor air damper 51 240 also becomes 0 because the opening angle of the exhaust air damper operates in conjunction with the outdoor air damper (first damper) 51 240.

A mixed air damper (third damper) 53 241 is displayed between the exhaust air and the outdoor air, and the open amount 256 thereof is displayed. In this case, the open amount of the mixed air damper is indicated by an open angle. When the open angle is 0 degree, the mixed air damper is in a closed state. When the open angle is 90 degrees, the mixed air damper is in a maximum open state. The mixed air damper is open at a maximum of 90 degrees because exhaust air is 0%, outdoor air is 0%, and return air is 100%.

Furthermore, a temperature sensor 258 for measuring a temperature of mixed air in which return air and outdoor air are mixed is displayed between the mixed air damper 241 and the outdoor air damper 240.

In this case, heat exchangers 243, 244 installed between the outdoor air or mixed air side and the supply air side are displayed, and pressure 257 of a refrigerant supplied when a heat exchange is performed is displayed. A filter 242 for removing alien substances included in air introduced into the heat exchanger is displayed. Whether filter cleaning is required is determined based on a filter cleaning cycle or the data value of a filter differential pressure sensor mounted on the filter, and a filter icon 259 indicative of a cleaning time is displayed.

Sensors for pressure 263, humidity 262, and temperature 261 are displayed on the part of the supply air 238, and a supply air fan 245 is also displayed. Supply air fans 245 are also indicated by F1 to F6 depending on the number of installed fans, and each indicates the operating state of each fan.

The fan and the damper displayed in the monitoring menu 230 may be displayed in the form of images that move according to the operation state, and whether each sensor normally operates is indicated based on a color or displayed data value. Furthermore, a warning icon may be displayed.

Figure 12:
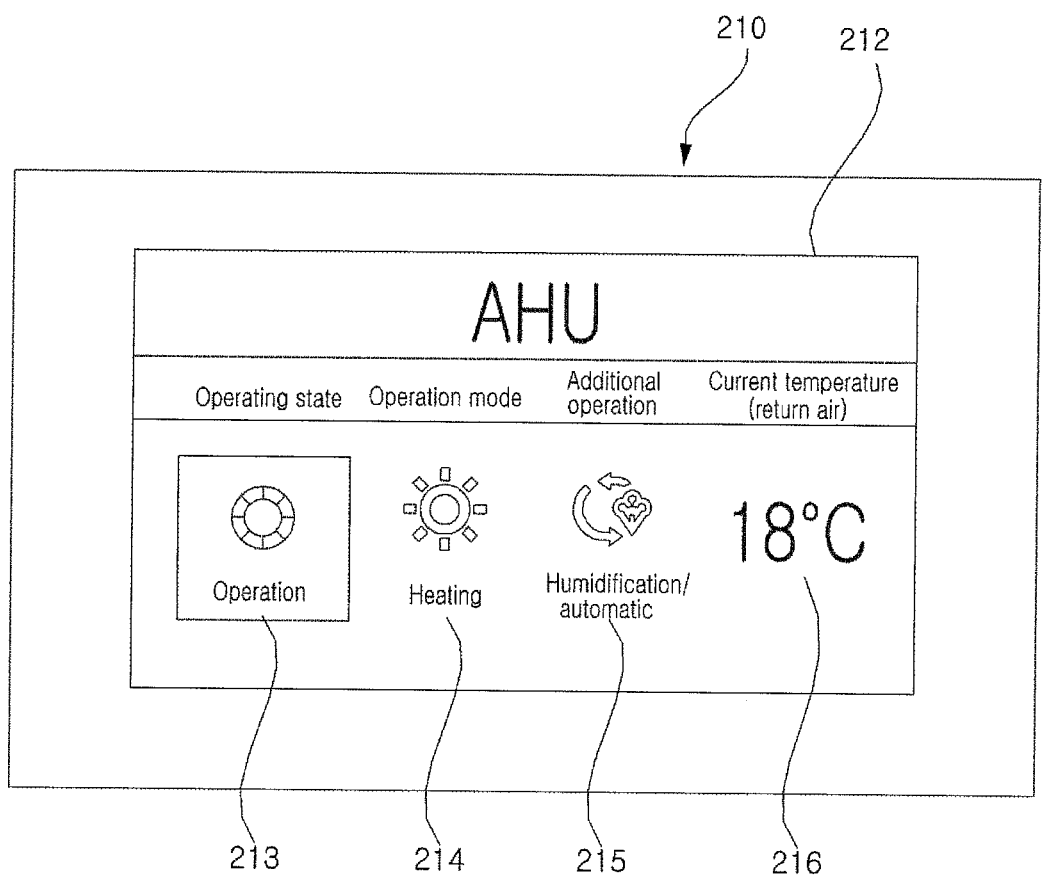

FIG. 10 is an exemplary diagram in which detailed information of the monitoring menu displayed on the interface unit is displayed. As illustrated in FIG. 12, when the detailed view tab 232 is selected, detailed information about a temperature and humidity 271, a locking state 272, a damper opening angle 273, and a fan operation state 274 are displayed in the monitoring menu 230. That is, the detailed information is detailed information about the operating state of the AHU of the aforementioned system view tab 231.

The temperature and humidity of each of return air, supply air, outdoor air, and mixed air are indicated by numerical values, and a locking state according to control mode is indicated by an icon. Furthermore, the damper open amount of each of the outdoor air, the exhaust air, and the mixed air is indicated. The damper open amount is indicated by closing 0 degree to maximum opening 90 degrees. Furthermore, the fan operation state 274 of each of the return air fan and the supply air fan is displayed. In this case, whether each fan has been turned on or off and whether abnormality has occurred in the fan are displayed.

FIG. 11 is an exemplary diagram in which the outdoor unit state of the monitoring menu displayed on the interface unit is displayed. As illustrated in FIG. 11, information about the state of a heat source, in particular, the outdoor unit 2 connected to the AHU 1 is displayed in the monitoring menu 230.

Information about the state of the outdoor unit connected to the AHU 1 is displayed for each outdoor unit (281 to 286). An address for communication with each outdoor unit, the operation state of any one of an operation, a stop, and an error, and whether a defrost operation is performed are displayed.

Furthermore, a plurality of pages may be divided and displayed depending on the number of connected outdoor units 2. If a heat source is not an outdoor unit, for example, if a heat source is a boiler or a cooling top, information about the boiler or cooling top is displayed.

FIG. 12 is an exemplary diagram illustrating the standby screen of the interface unit in accordance with an embodiment of the present invention. As illustrated in FIG. 12, if there is no input for a specific time, the control unit 111 of the interface unit 5 displays a standby screen 212.

If there is no separate input through the input unit 150 in the state in which the monitoring screen 210 has been output as described above, the control unit 111 switches to and displays the standby screen 212. Brief information about the AHU 1 is displayed on the standby screen 212.

Information about an operation state 213, operation mode 214, an additional operation 215, and a current temperature 216 are displayed on the standby screen 212 as brief information. The information is displayed in the form of an image, an icon, a number or letter, or a combination of them. The operation state indicates whether an operation is in progress. The operation mode indicates information about operation mode that belongs to operation mode, such as heating, cooling, ventilation, dehumidification, and outdoor air cooling, and that has been currently set. A set additional operation is displayed, and a return air temperature is indicated as a current temperature. In this case, an indoor temperature may be based on a return air temperature in the case of a return air temperature and may be based on a supply air temperature if a supply air temperature is an indoor temperature.

Accordingly, the air conditioning system in accordance with an embodiment of the present invention includes the AHU configured to circulate indoor air and by controlling return air, exhaust air, outdoor air, and supply air and control an indoor temperature by controlling a circulation temperature. Accordingly, heat efficiency can be improved, and temperature control and return air control can be performed at the same time. The air conditioning system includes the controller configured to control the AHU. Accordingly, management becomes facilitated by monitoring the operating state of the AHU through the interface unit that is the input/output unit of the controller and that may be detachable and also controlling the operation of the AHU.

While some exemplary embodiments of the present invention have been described with reference to the accompanying drawings, those skilled in the art may change and modify the present invention in various ways without departing from the essential characteristics of the present invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioning system, comprising:
an air handling unit (AHU) configured to:
control outdoor air that is externally supplied,
exhaust air that is discharged from indoors to outdoors, and return air that is circulated indoors and supplied again,
control the outdoor air or mixed air of the return air and the outdoor air, and
supply cool or warm supply air indoors;
at least one outdoor unit configured to provide a heat source for a heat exchange to the AHU;
a first controller including a processor configured to receive operating state data of the AHU, and to control operation of the AHU by communicating with the outdoor unit; and
an interface to couple to the first controller, the interface to include an input unit and a display screen, and the interface configured to:
display, on the display screen, a control menu of the AHU,
send data, received through the control menu, to the first controller, and
display, on the display screen, a monitoring screen relating to the operating state of the AHU and the outdoor unit,
wherein the first controller provides, to the interface, the operating state data of the AHU, and the first controller sets an operation of the AHU in response to data received from the interface,
wherein the interface having the display screen is configured to be mounted on the first controller and is attachable to or detachable from the first controller,
the interface displays, on the monitoring screen, a flow of the exhaust air, the outdoor air, the return air, and the supply air of the AHU, wherein the interface changes, in real time, the operating state of the AHU in response to data received from the first controller, and displays the changed operating state,
wherein the interface displays, on the display screen, a schedule setting menu for the AHU, and the interface provides, to the first controller, schedule data received through the schedule setting menu,
wherein the first controller includes:
a main unit configured to control operation of the AHU;
an input/output unit to couple to devices including a sensor, a valve, and a damper in the AHU, and the input/output unit configured to transfer a control command of the main unit and to input data from at least one device to the main unit;
a communication unit configured to communicate with the outdoor unit; and a driving unit configured to control rotational operation of a fan in the AHU,
wherein the driving unit includes an inverter and an inverter driver to drive a motor of the fan, and the driving unit is provided or is removed based on a total number of fans in the AHU.

2. The air conditioning system of claim 1, wherein the main unit is internally coupled to the input/output unit, the communication unit, and the driving unit, and the main unit is configured to send and receive data, determine an operating state of the AHU in response to data received from the AHU or the input/output unit, and control the operation of the AHU in response to the received data.

3. The air conditioning system of claim 1, wherein the main unit receives, from a plurality of sensors, data regarding at least one of a temperature, humidity, pressure, an operation signal of the fan, an operating state, an emergency signal, a warning signal, and state information of the AHU, and the plurality of sensors are provided at the AHU.

4. The air conditioning system of claim 1, wherein the input/output unit transfers, to the valve or the damper, a control command of the main unit so that the valve or the damper operates,
the input/output unit inputs data of the valve and the damper to the main unit,
the input/output unit receives data regarding at least one of a temperature, flow velocity, and degree of air pollution from a sensor at the AHU,
the input/output unit sends the data to the main unit,
the input/output unit transfers a control command of the main unit to a humidifier or a heater in the AHU, and
the input/output unit inputs, to the main unit, operation data of the humidifier or the heater.

5. The air conditioning system of claim 1, wherein the first controller stores the operating state data of the AHU and the outdoor unit, and stores a control history.

6. The air conditioning system of claim 1, wherein the interface displays the monitoring screen based on a graphic user interface (GUI) to the air conditioning system in accordance with operating state data received from the first controller.

7. The air conditioning system of claim 1, wherein the interface displays an operation state of each of the outdoor units coupled to the AHU.

8. The air conditioning system of claim 1, wherein the interface changes to a standby state when data is not received for at least a specific time, and the interface outputs, while in a standby state, brief information regarding the AHU.

9. The air conditioning system of claim 1, wherein the interface displays, on the monitoring screen, an image or an icon corresponding to each of a plurality of devices in the AHU, and the images or the icons are provided at the monitoring screen, based on specific locations of the plurality of devices.

10. The air conditioning system of claim 1, wherein the interface is connected to a connection terminal for communication through a communication line to the first controller, and the interface is configured to send and receive data.

11. The air conditioning system of claim 1, further comprising a second controller configured to control operation of the outdoor unit,
wherein the second controller is coupled to the first controller, and the second controller is configured to send and receive data of the outdoor unit.

12. The air conditioning system of claim 1, further comprising a building controller to couple to at least one of a light apparatus, a movement device, a security apparatus, and an alarm apparatus, and the building controller is configured to control the light apparatus, the movement device, the security apparatus, and the alarm apparatus,
wherein the first controller to couple to the building controller, and the first controller is configured to control the AHU in response to a warning signal or a fire signal received from the building controller, and
the building controller controls the light apparatus and the movement device in accordance with an operating state of the AHU.

13. An air conditioning system, comprising:
an air handling device configured to control supplied outdoor air, to exhaust air that is discharged, to control the outdoor air or mixed air of return air and the outdoor air, and to supply air indoors, the air handling device to include at least one sensor;
an outdoor device to provide a heat source;
a controller to receive operating state information of the air handling device and control operation of the air handling device based on communication with the outdoor device; and
an interface to display, on a display screen of the interface, a control menu, to send data, input at the control menu, to the controller, and to display, on the display screen, a monitoring screen that includes information regarding operating state of the air handling device or the outdoor device, and
wherein the controller provides, to the interface, the operating state information of the air handling device, and the controller sets an operation of the air handling device in response to data received from the interface,
wherein the interface having the display screen is configured to be mounted on the controller and is attachable to or detachable from the controller,
the interface displays, on the monitoring screen, a flow of the exhaust air, the outdoor air, the return air, and the supply air of the air handling device, wherein the interface changes, in real time, the operating state of the air handling device in response to data received from the controller, displays, on the display screen, the changed operating state, and the interface displays, on the display screen, a schedule setting menu for the air handling device, and the interface provides, to the controller, schedule data received through the schedule setting menu
wherein the controller includes:
a main unit configured to control operation of the air handling device;
an input/output unit to couple to devices including a sensor, a valve, and a damper in the air handling device, and the input/output unit configured to transfer a control command of the main unit and to input data from at least one device to the main unit;
a communication unit configured to communicate with the outdoor unit; and
a driving unit configured to control rotational operation of a fan in the air handling device,
wherein the driving unit includes an inverter and an inverter driver to drive a motor of the fan, and the driving unit is provided or is removed based on a total number of fans in the air handling device.

* * * * *